June 19, 1923.
H. W. HILL
GLASS CUTTER
Filed April 2, 1920
1,459,369
3 Sheets-Sheet 1
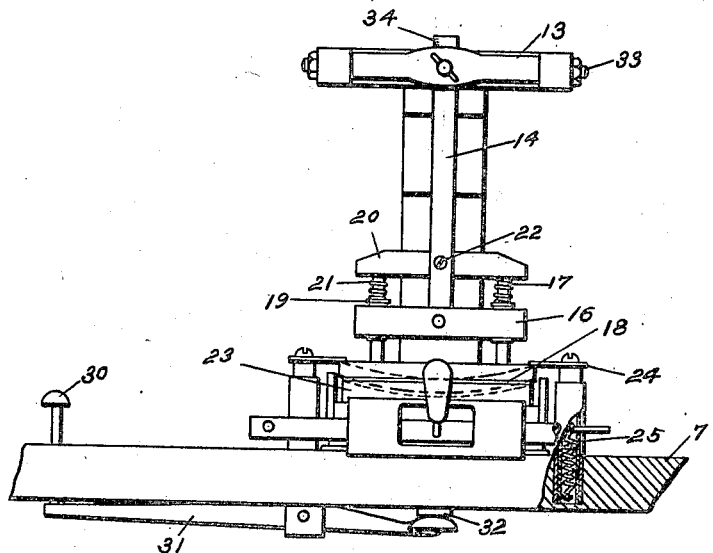
FIG. I
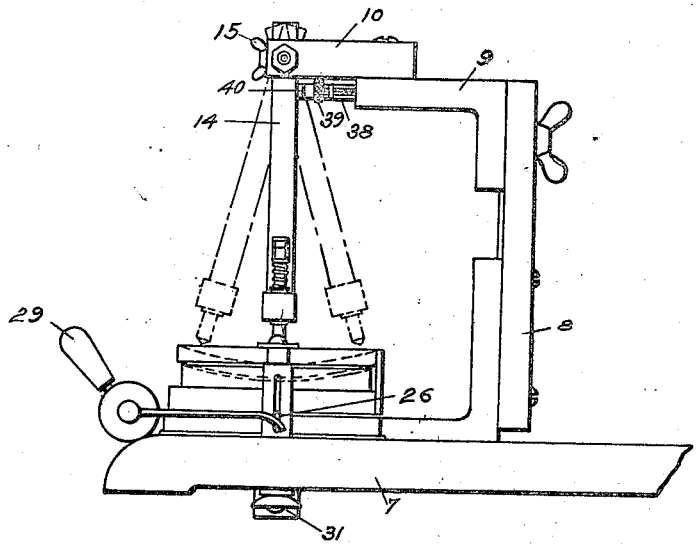
FIG. II
INVENTOR
HARRY W. HILL
BY
ATTORNEYS June 19, 1923.
H. W. HILL
GLASS CUTTER
Filed April 2, 1920    3 Sheets-Sheet 2
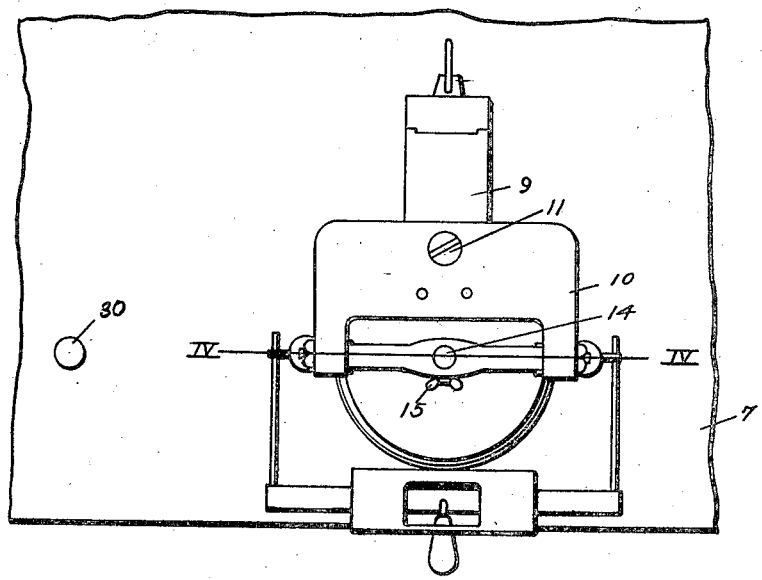
FIG. III
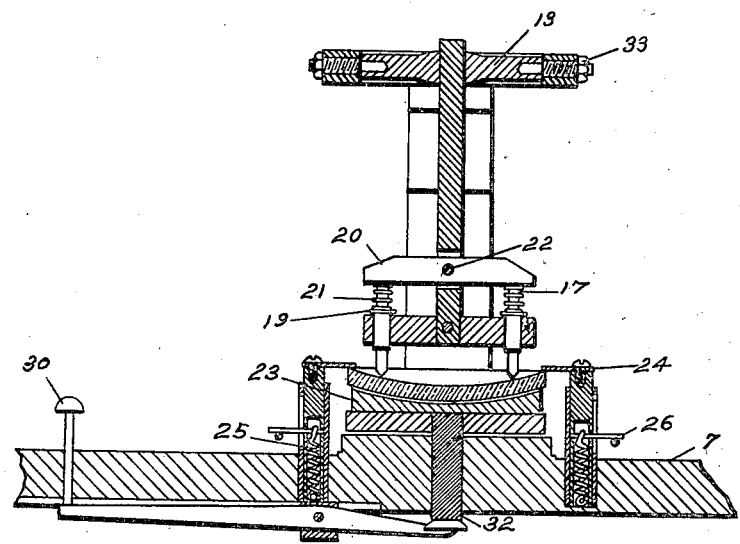
FIG. IV
INVENTOR
HARRY W. HILL
BY
ATTORNEYS June 19, 1923.
H. W. HILL
GLASS CUTTER
Filed April 2, 1920
1,459,369
3 Sheets-Sheet 3
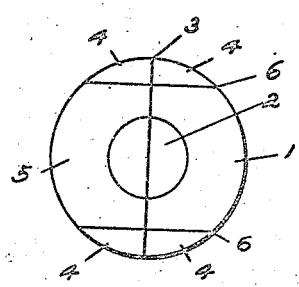
FIG. VI
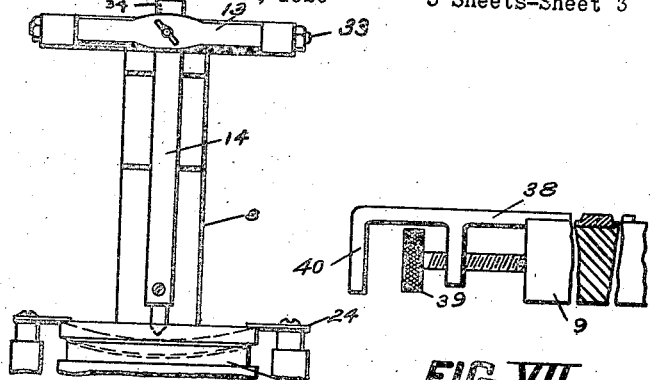
FIG. V    FIG. VII
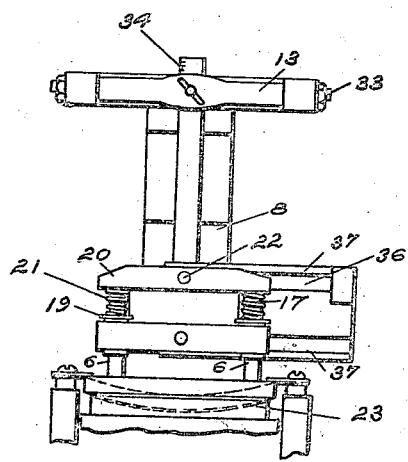
FIG. VIII
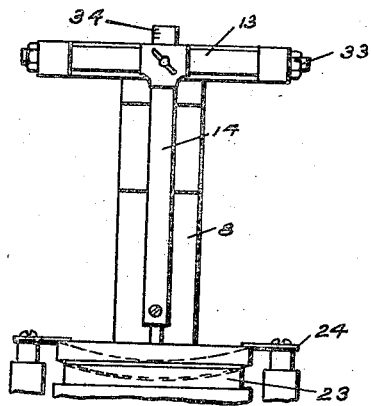
FIG. IX
INVENTOR
HARRY W. HILL
BY
ATTORNEYS Patented June 19, 1923.

1,459,369

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GLASS CUTTER.

Application filed April 2, 1920. Serial No. 370,723.

*To all whom it may concern:*

Be it known that I, HARRY W. HILL, a citizen of the United States, residing at Southbridge, in the county of Worcester and State of Massachusetts, have invented certain new and useful Improvements in Glass Cutters, of which the following is a specification.

This invention relates to improvements in glass cutters and has particular reference to an improved type of cutter especially adapted for use in the cutting of lenses or lens blanks.

The leading object of the present invention is the provision of a novel and improved construction of machine which will serve to automatically satisfactorily cut or split lens blanks or similar glass members.

A further object of the present invention is the provision of a device of this character in which the article to be cut may be readily accurately positioned and securely held in such position during the cutting operation, and in which the cutting operation shall be automatically guided and controlled and the requirement for manual skill in performing the operation reduced to a minimum.

Other objects and advantages of the present invention should be readily apparent by reference to the following specification taken in connection with the accompanying drawings, and it will be understood that I may make any modifications in the specific details of construction shown and described within the scope of the appended claims without departing from or exceeding the spirit of this invention.

Figure I represents a front view of a machine embodying these improvements.

Figure II represents a side elevation thereof.

Figure III represents a plan view.

Figure IV represents a sectional view as on the line IV—IV of Figure III.

Figure V represents a front view of a machine intended to perform a single cutting operation.

Figure VI represents a plan view of the blank as cut before separation of the parts.

Figure VII represents a fragmentary sectional view of a stop mechanism on my machine.

Figure VIII represents a fragmentary view of an adjustable type cutter.

Figure IX is a detail of a transverse adjustment for the cutter arm.

The present invention relates to an improved machine adapted for cutting various forms of glass or lenses, but particularly adapted for use in the cutting of target like bifocal lens blanks.

In the present day manufacture of bifocal lenses a large percentage of these are manufactured in the form of concave disc or target, such as shown in position in the machine and as illustrated in detail in connection with Figure VI, the lens having the outer zone 1 adapted to form the distance portion, and the inner bull's-eye 2 to form the reading portion of a plurality of finished lenses. It has been customary in the past to centrally split such targets by a suitable hand diamond cutter or the like, as along the line 3, and to then crumb or break off the portions 4 to provide a substantially rectangular blank as 5. It is the primary purpose for which I have designed the machine of my present invention to eliminate both possibility of inaccurate cuts, as when hand cutting is done, and to eliminate the liability of breakage and time required in the case of the crumbing operation, by providing a novel and improved machine through the use of which a series of automatic cuts may be made, as indicated at 3 and 6 on the blank of Figure VI, so that it is afterwards necessary to simply invert the lens giving it a light blow with a mallet or the like, when the several cuts applied to the glass will split through and the two or more lens forming halves will be in final usable condition.

In the accomplishment of the foregoing I preferably make use of a suitable base or table portion 7 having rising therefrom the standard 8, on which is mounted for vertical adjustment the bracket 9 capable of forward extension on account of its telescoping section 10, secured in desired adjusted position as by the fastening device 11. This arm 10 is provided with the furcations 12 between which is journaled the swinging head 13, having sliding therethrough the cutter rod 14, locked in vertically adjusted position in the head as by the wing nut or other suitable clamping device 15. The member 14 depends from the head 13 and bears at its lower end the cutter guide 16, in which is slidably mounted the cutters 17 provided as with the diamond points 18, being limited in their downward movement through the guides 16, as by the collars 19. Bearing against these collars at their lower ends and at their upper ends against the equalizer bar 20 are the springs 21, the equalizer bar extending through the cutter bar or arm 14, and being held for pivotal movement by the pivot pin 22. This is such that any inequality in the position of the cutting points 18 will be equalized by rocking movement of the member 20 so that the two cutters will bear with substantially equal pressure upon the work. In use the lens or other article to be cut is placed on the holder 23, preferably shaped to fit the under side of the blank, as when standard form blanks are to be cut thereby, and is there secured in position through release of the clamp members 24 downwardly actuated by the springs 25, but having the laterally projecting pins 26 adapted to be engaged by the rocker arms 27 of the rocker 28 controlled by a handle 29 at the front of the bed or table 7. Depression of this handle serves to raise the clamps against the tension of their springs so that the lens may be readily removed or inserted. The springs 25 draw the clamps down into engagement with and lock the lens in position upon the holder or support 23. The lens having been locked in this position I, through the actuating knob 30, depress the outer end of the shift lever 31 to cause its inner end to press upward on the stud 32 of the lens support 23, this action increasing the tension of the springs 25 to cause the clamps to more firmly hold the lens in exact position on its supporting table 23.

As has been previously mentioned, the bracket 9 is vertically adjustable upon its standard 8, while the arm 14 is vertically adjustable through the head 13 and in use my improved cutter is so set that the distance from the pivot axis 33 to the plane of the cutting points is slightly less than the radius length of the curve on the glass surface to be cut, while the height of the bracket 9 is so adjusted that the cutting points will just swing freely above the lens blank when the table 23 is in depressed position. To facilitate this adjustment of the parts a suitable scale may be placed on the cutter arm 14 as at 34 for different radius lengths, while the height of the bracket may be adjusted by the operator without the necessity of a proper scale once the correct radius length has been determined. The parts having been thus properly adjusted depression of the knob 30 raises the lens and lens table 23 to press against the cutter points 18, when it is merely necessary to give the cutter a swinging movement across the lens when a pair of cuts such as those illustrated in Figure VI will be formed on the glass blank. The knob 30 may then be released, the handle 29 rocked to disengage the clamps and the block withdrawn from the two point cutter and transferred to the corresponding cutter illustrated in Figure V, the only difference between the cutters in question being that in Figure V the arm 14 is shown as carrying a single in place of a double cutting point. The lens is then turned at right angles to its previous position, its exact position being determined by alinement of the cuts just made with suitable designations 35 on the table 23, when the second cutter is swung as before forming the cut 3.

It will be understood that the order of these operations may be reversed if preferred, the essential result to be accomplished being the formation of the sets of cuts upon the blank before the parts are actually separated, thus making it possible after the plurality of cuts have been made with the diamond, to, with a single blow, cause all of the parts to separate and thus increase in speed as well as greatly facilitate the ease of handling and correct positioning of the cuts.

While I have just described my machine as being used in duplicate, that is with one part having a single and the other a double cutter, it will be understood that the results in question may all be accomplished with a single machine if preferred by employing the mechanism shown in Figures VIII or IX, as preferred.

In Figure VIII, I have shown the double cutter head mechanism as mounted on a slide 36 so that it may be used either for the pair of cutters 6 or may be laterally shifted to bring one of the cutting points central with the arm 14 and with the blank given half a turn to make the cut 3 the walls 37 of the slide guide 36 in this instance preferably engaging with the compensating arm 20 to lock it against rocking movement when the cutter is centrally used, and the amount of movement of the table 23 being sufficient to compensate for the shortening of the combined length of arm and cutter due to the transverse shifting so that it is unnecessary to change the length of the cutter arm for the central cut.

In Figure IX, I have shown a similar result making use of the single cutter shown in Figure V, but in this instance having the cutter laterally shiftable along the head 13' so it may be set for either center or laterally displaced arcuate cuts, as may be desired.

In some instances I wish to make use of my cutter in splitting a blank into possibly three in place of two parts, in which event it is desirable that the cutters extend merely from center to edge of the blank in place of entirely thereacross, as illustrated in Figure VI. To facilitate the accomplishment of this result I may slidably secure to the bracket 9 the stop device 38, which may be adjusted as by the screw 39 to vary the position of the contact or abutment portion 40, which may be shifted outward to engage and limit the movement of the arm 14 to a half swing in place of a full swing, when the cut from center to edge only of the blank will be made, after the making of one of these cuts the blank being turned for as many additional cuts as desired, each cut intersecting the other at the center, but being prevented by adjustment of the stop from extending beyond the center point.

From the foregoing description it will be seen that I have provided a novel and improved form of cutter in which the cutter point or points may be so adjusted as to swing on an arc and, therefore, particularly adapted for use in forming straight line cuts on concave surfaces, and which will make said cuts in absolute accurate predetermined position with respect to the position of a blank therebeneath, which may be so adjusted that there will be practically no rise and fall of the cutter during the cutting operation, and in which consequently most satisfactory contact between the cutter and article to be cut will be insured at an even and equal pressure, and thus an extremely satisfactory clean cut secured. It will further be noted that through the use of my improved machine it is possible to either split the article its entire transverse width or to limit the cutting action to any predetermined part, and also that it is possible through the use of this cutter to split or cut the device either centrally or at points distant from the center and in accurate relationship thereto, as may be desired.

I claim:

1. A device of the character described, a supporting bracket, a cutting point, a swinging support therefor carried by the bracket, means for varying the distance between the cutter and bracket to adjust the radius of the arc through which the cutter swings, and means for limiting the swinging movement of the cutter in one direction.

2. A lens cutter including an upright support, a pendulous cutter rod carried by the support and extending downwardly therefrom, and cutters carried by the lower portion of the rod for operation as the rod is oscillated.

3. A device of the character described comprising a lens table, an upright support having a portion extending above the table, and an oscillatable cutter rod depending from the upright and oscillatable across the lens table, said rod having cutters for operative engagement with a lens on the table as the rod is oscillated.

4. A device of the character described, including a work support, a bracket rising adjacent thereto, an adjustable arm on the bracket, a cutter arm adjustably and pivotally secured to the bracket arm and normally alined with the work support, and a yieldingly supported cutter carried by said arm.

5. A device of the character described, including a head, parallel cutters carried by the head, a pivot support for the head, and a radius rod adjustably connecting the head and support.

6. A device of the character described including a lens holder, a bracket disposed adjacent the holder and having a portion overlying the latter in spaced relation thereto, a cutter rod carried by the projecting portion of the bracket and oscillatable with respect thereto, cutters carried by the cutter rod and normally supported a distance above the lens support, and means for raising the lens support to bring the lens thereon into operative engagement with the cutters.

7. A device of the character described, including a work support, resilient clamps for engaging the edge of the work to retain the same on the support, yielding means normally pressing the clamps toward the support, means for lifting the support and clamps to bring the work into operative position, and a swinging cutter head having a cutting point to engage the work when in raised position.

8. A device of the character described, including a work support, resilient clamps for engaging the edge of the work to retain the same on the support, yielding means normally pressing the clamps toward the support, means for lifting the support and clamps to bring the work into operative position, a swinging cutter head having a cutting point to engage the work when in raised position, and means for varying the curve through which the cutter point swings.

9. A device of the character described, including a work support, resiilent clamps for engaging the edge of the work to retain the same on the support, yielding means normally pressing the clamps toward the support, means for lifting the support and clamps to bring the work into operative position, a swinging cutter head having a cutting point to engage the work when in raised position, means for varying the curve through which the cutter point swings, and means for limiting the length of arc through which the cutter swings and thus the surface of the work operated upon.

In testimony whereof I have affixed my signature, in presence of two witnesses.

HARRY W. HILL.

Witnesses:
ESTHER M. LAFLER,
ALICE G. HASKELL.